United States Patent
Wu et al.

(10) Patent No.: US 11,283,653 B2
(45) Date of Patent: Mar. 22, 2022

(54) DECISION FEEDBACK EQUALIZER AND RELATED CONTROL METHOD

(71) Applicant: Realtek Semiconductor Corp., HsinChu (TW)

(72) Inventors: Tsung-Chen Wu, HsinChu (TW); Liang-Wei Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/110,267

(22) Filed: Dec. 2, 2020

(65) Prior Publication Data

US 2022/0029863 A1  Jan. 27, 2022

(30) Foreign Application Priority Data

Jul. 24, 2020 (TW) ................................. 109125123

(51) Int. Cl.
*H04L 25/03* (2006.01)

(52) U.S. Cl.
CPC .. *H04L 25/03057* (2013.01); *H04L 25/03146* (2013.01); *H04L 25/03267* (2013.01); *H04L 25/03343* (2013.01); *H04L 2025/0349* (2013.01); *H04L 2025/03617* (2013.01)

(58) Field of Classification Search
CPC ....... H04L 25/03057; H04L 2025/0349; H04L 25/03146; H04L 25/03343; H04L 2025/03617; H04L 25/03267; H04L 27/01
USPC ................. 375/371, 350, 229–234
See application file for complete search history.

(56) References Cited

U.S. PATENT DOCUMENTS

| | | | |
|---|---|---|---|
| 8,199,804 B1 * | 6/2012 | Cheong | H04L 25/0307 375/233 |
| 9,281,971 B1 * | 3/2016 | Edelkhani | H04L 1/242 |
| 2006/0008279 A1 * | 1/2006 | Chiang | H04B 10/6971 398/202 |
| 2010/0046683 A1 * | 2/2010 | Beukema | H04L 7/0062 375/355 |
| 2011/0268044 A1 * | 11/2011 | Yun | H04W 24/00 370/329 |
| 2014/0064352 A1 * | 3/2014 | Zhong | H04L 25/03038 375/233 |
| 2014/0146867 A1 * | 5/2014 | Shvydun | H04L 25/03885 375/233 |
| 2014/0294059 A1 * | 10/2014 | Yamagata | H04L 25/03159 375/233 |

(Continued)

*Primary Examiner* — Emmanuel Bayard
(74) *Attorney, Agent, or Firm* — Winston Hsu

(57) ABSTRACT

A decision feedback equalizer for generating an output signal according to an input signal includes: a feedforward equalizer, a feedback equalizer and a weight coefficient control unit. The feedforward equalizer includes a plurality of tapped delay lines and is controlled by a set of first weight coefficients. The feedback equalizer includes a plurality of tapped delay line and is controlled by a set of second weight coefficients. The weight coefficient control unit is employed to selectively adjust at least one of the set of first weight coefficients and determine a set of first boundary values for at least one of the set of second weight coefficients. When the at least one of the set of second weight coefficients does not exceed the set of first boundary values, the weight coefficient control unit increments the at least one of the set of first weight coefficients.

10 Claims, 5 Drawing Sheets

(56) References Cited

U.S. PATENT DOCUMENTS

| | | | |
|---|---|---|---|
| 2016/0065394 A1* | 3/2016 | Sindalovsky | H04L 25/03012 |
| | | | 375/371 |
| 2017/0104614 A1* | 4/2017 | Ma | H04L 25/03133 |
| 2018/0191488 A1* | 7/2018 | Matsudaira | H04B 3/06 |
| 2019/0108659 A1* | 4/2019 | Li | G06T 5/002 |
| 2019/0394580 A1* | 12/2019 | As'ad | H04R 25/505 |
| 2021/0267563 A1* | 9/2021 | Sattarivand | A61B 6/482 |

\* cited by examiner

DECISION FEEDBACK EQUALIZER AND RELATED CONTROL METHOD

BACKGROUND OF THE INVENTION

1. Field of the Invention

The present invention relates to decision feedback equalizers, and more particularly to, decision feedback equalizers and related control methods that can avoid error prorogation by adjusting weight coefficients of equalizers in multiple stages.

2. Description of the Prior Art

When a signal is transmitted through a channel, it is often distorted due to the time dispersion effect. This effect occurs when the channel frequency response has the non-constant amplitude and the non-linear phase. Accordingly, the amplitude and the phase of the signal will be distorted due to the channel response, resulting in inter-symbol interference (ISI), which will make the receiving end fail to correctly identify the transmitted signal.

A decision feedback equalizer can be used to eliminate the aforementioned channel distortion. The decision feedback equalizer includes a feedforward equalizer, a decision unit, and a feedback equalizer. The feedforward equalizer is also called zero-forcing equalizer, which allows a convolution of the channel response and the impulse response of and the equalizer to have a value in only one place. The advantage of the feedforward equalizer is its simple structure, but its disadvantage is that it amplifies the noise and also causes decision errors. Therefore, it is necessary to introduce a feedback equalizer to solve such problem. The feedback equalizer uses detected symbol $d_0$ as input under the assumption that the symbol detected by the decision feedback equalizer is correct, thereby eliminating the ISI of the channel. Therefore, the feedback equalizer does not amplify noises.

Generally speaking, the decision feedback equalizer usually relies on the use of a least-mean-square algorithm to determine a weight coefficient for each tapped delay line in the feedforward equalizer and the feedback equalizer. By repeatedly adjusting the weight coefficients in the feedforward equalizer and the feedback equalizer, a least-squares solution obtained by the least-mean-square algorithm can be approximated, thereby converging to a high signal-to-noise ratio. However, in some cases, when a decision unit in the decision feedback equalizer makes a decision error, such error will be inputted to the feedback equalizer. At the same time, the decision error will also be feedback to the whole decision feedback equalizer from an output terminal of the feedback equalizer. If the decision error is significant, it may cause a huge error looping between the feedback equalizer and the decision unit. Such situation is called error propagation. When the error propagation is too severe, the whole decision feedback equalizer system will not converge, resulting in a systematic collapse.

SUMMARY OF THE INVENTION

In order to avoid the occurrence of the error propagation, the present invention provides a mechanism for controlling the decision feedback equalizer. In the control mechanism of the present invention, the weight coefficient in the feedback equalizer is limited at an early stage of convergence for a least-mean-square algorithm, thereby limiting the energy of the weighting of the feedback equalizer. Thus, once the decision error occurs, it can be avoided that the error propagation caused by the amplifying the decision error and failure of convergence of the least-mean-square algorithm. Moreover, as the decision error at the early stage of convergence is more considerable compared to a stable convergence state, it is meaningful to suppress the energy of the weighting of the feedback equalizer thereby to improve the stability of the early stage of convergence. Furthermore, when the least-mean-square algorithm tends to converge, the control mechanism of the present invention will relax constraints on weight coefficients of the feedback equalizer, such that in the stable convergence state, the weight coefficient gradually approaches a least-square solution, improving the signal-to-noise ratio of the signal. In this way, the stability of the least-mean-square algorithm and a good signal-to-noise ratio can be achieved.

According to one embodiment of the present invention, a decision feedback equalizer for generating a decision output signal according to an input signal is provided. The decision feedback equalizer comprises: a feedforward equalizer, a feedback equalizer and a weight coefficient control unit. The feedforward equalizer has a plurality of tapped delay lines, and is controlled by a set of first weight coefficients. The feedback equalizer has a plurality of tapped delay line, and is controlled by a set of second weight coefficients. The weight coefficient control unit is arranged to selectively adjust at least one of the set of first weight coefficients and determine a set of first boundary values for at least one of the set of second weight coefficients, wherein when the at least one of the set of second weight coefficients does not exceed the set of first boundary values, the weight coefficient control unit increments the at least one of the set of first weight coefficients.

According to one embodiment, a A method for controlling a decision feedback equalizer that generates a decision output signal according to an input signal is provided. The decision feedback equalizer has a feedforward equalizer and a feedback equalizer. The method comprises: selectively adjusting a least one of a set of first weight coefficients that corresponds to a plurality of tapped delay lines of the feedforward equalizer; determining a set of first boundary values for at least one of a set of second weight coefficients that corresponds to a plurality of tapped delay lines of the feedback equalizer; when the at least one of the set of second weight coefficients does not exceed the set of first boundary values, incrementing the at least one of the set of first weight coefficients.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to "one embodiment" or "an embodiment" means that a particular feature, structure or characteristic described in connection with the embodiment or example is included in at least one embodiment of the present embodiments. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
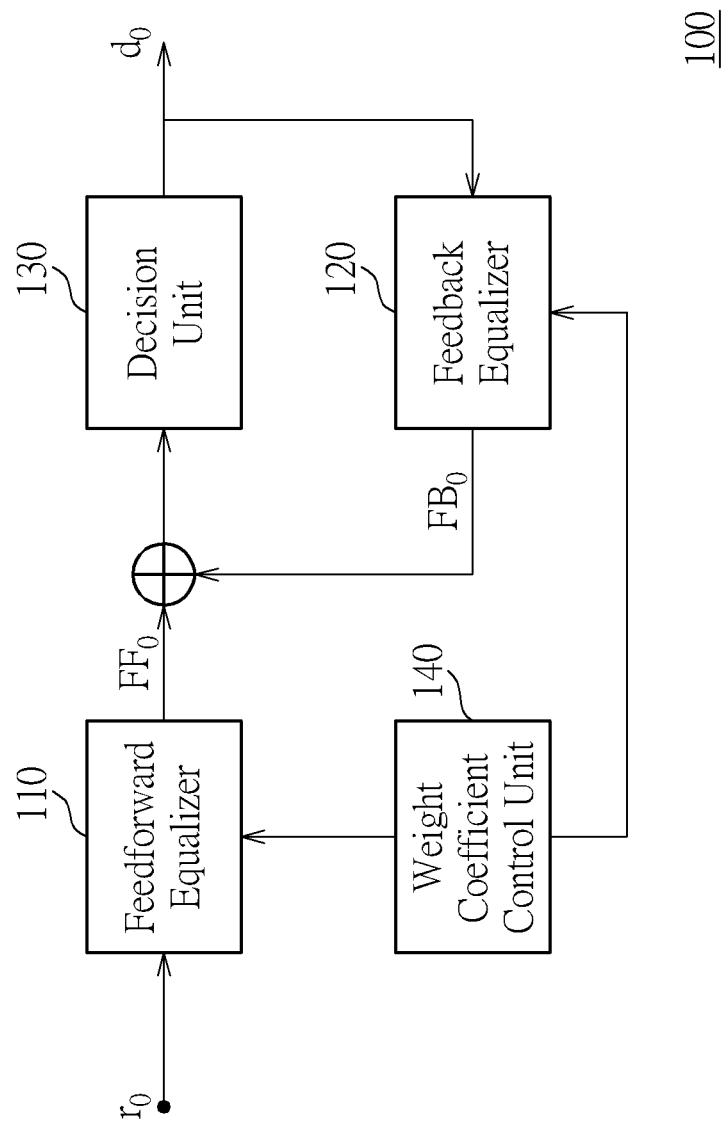
FIG. 1 is a functional block diagram of a decision feedback equalizer according to one embodiment of the present invention.

Please refer to FIG. 1, which is a schematic block diagram of a decision feedback equalizer according to one embodiment of the present invention. As shown in the figure, a decision feedback equalizer 100 includes a feedforward equalizer 110, a feedback equalizer 120, a decision unit 130, and a weight coefficient control unit 140. The decision feedback equalizer 100 receives an input signal $r_0$ from a channel and generates a decision output signal $d_0$. The feedforward equalizer 110 is arranged to generate a feedforward output signal $FF_0$ according to the input signal $r_0$, thereby eliminating pre-cursor and post-cursor interferences of the ISI that are caused by the channel. The feedback equalizer 120 is arranged to generate a feedback output signal $FB_0$ according to the decision output signal $d_0$, so as to eliminate the post-cursor interference of the ISI. The decision unit 130 is arranged to generate the decision output signal $d_0$ according to the feedforward output signal $FF_0$ generated by the feedforward equalizer 110 and the feedback output signal $FB_0$ generated by the feedback equalizer 120.

Figure 2A:
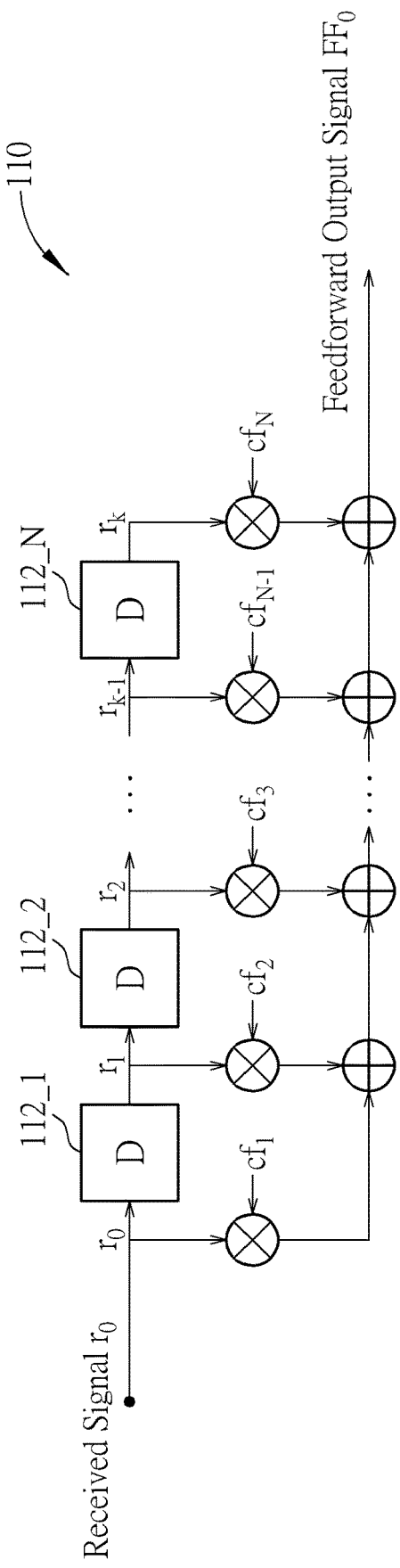
FIG. 2A and FIG. 2B are respectively schematic diagrams of the implementation of a feedforward equalizer and a feedback equalizer in the decision feedback equalizer of the present invention.
Figure 2B:
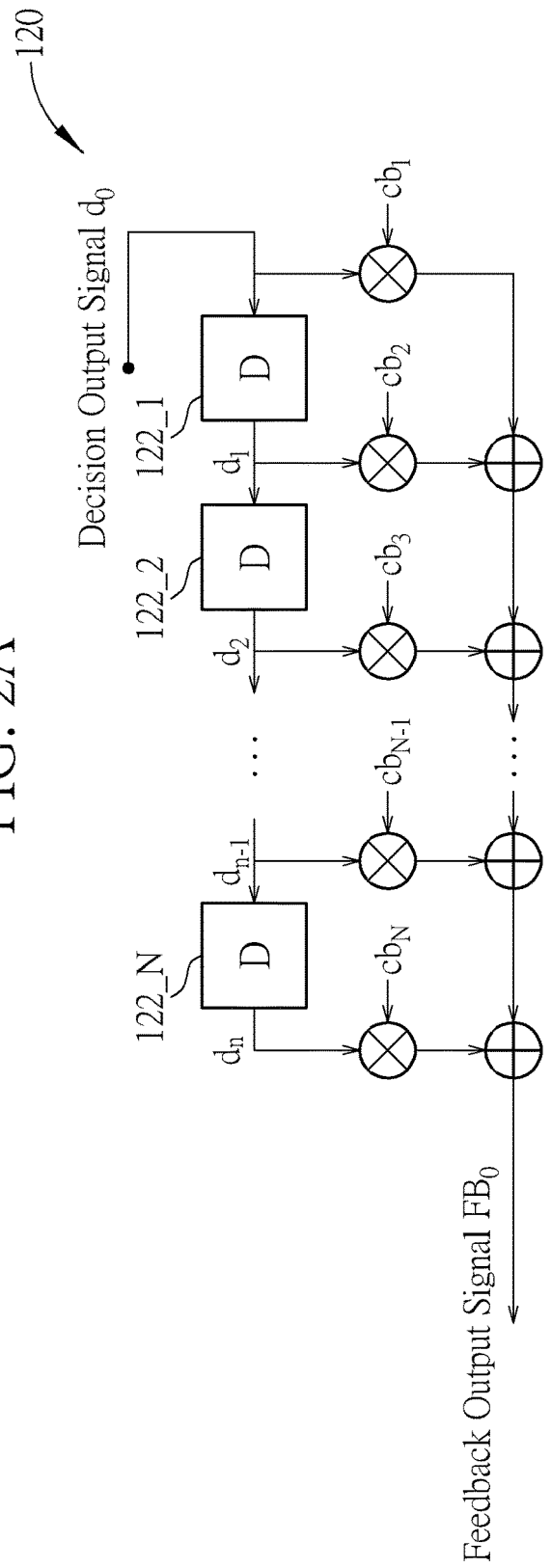

FIGS. 2A and 2B are schematic diagrams of the feedforward equalizer 110 and the feedback equalizer 120, respectively. Specifically, the feedforward equalizer 110 and the feedback equalizer 120 have multiple tapped delay lines 112_1-112_N and 122_1-122_N. The feedforward equalizer 110 and the feedback equalizer 120 are controlled by a set of weight coefficients $cf_1$-$cf_N$ and a set of weight coefficients $cb_1$-$cb_N$, respectively. The weight coefficient control unit 140 can control the weight coefficients $cf_1$-$cf_N$ and $cb_1$-$cb_N$ during the convergence of the decision feedback equalizer 100. In a control mechanism of the present invention, the weight coefficient control unit 140 adjusts the weight coefficients $cf_1$-$cf_N$ and $cb_1$-$cb_N$ with respect to the convergence of the decision feedback equalizer 100. In an early stage of convergence, the weight coefficient control unit 140 conservatively adjusts the weight coefficients $cf_1$-$cf_N$ and $cb_1$-$cb_N$ according to the least-mean-square algorithm and certain constraints, so as to improve the system signal-to-noise ratio while ensuring the stability of the convergence. In a stable stage of convergence, the weight coefficient control unit 140 adjusts one or more weight coefficients $cf_K$ in the feedforward equalizer 110, and observes corresponding changes of one or more weight coefficients $cb_K$ in the feedback equalizer 120. Accordingly, the weight coefficient $cf_K$ and the weight coefficient $cb_K$ gradually approach a least-squares solution obtained by the least mean square algorithm. In the early stage of convergence, the present invention will set certain constraints on the weight coefficients $cf_K$ and $cb_K$, which makes an adjustable range of the weight coefficient $cf_K$ smaller. In the stable stage of convergence, the constraints on the weight coefficient $cb_K$ will be relaxed, allowing the weight coefficient $cf_K$ to have a larger adjustment range, so that the weight coefficients $cf_K$ and $cb_K$ can get closer to the least-squares solution during the stable stage of convergence, so as to improve the system signal-to-noise ratio.

Figure 3:
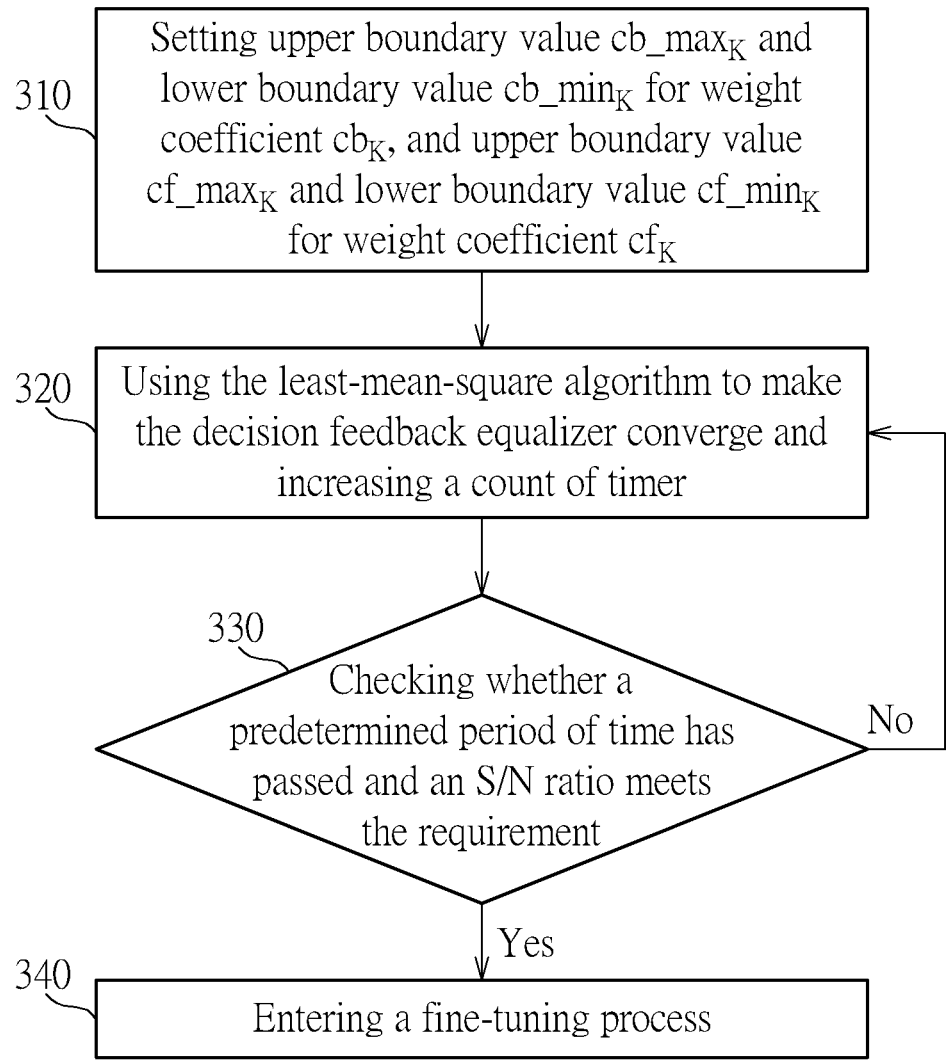
FIG. 3 is a flowchart of a rough-tuning process of a control method according to one embodiment of the present invention.

Please refer to FIG. 3, which is a flowchart of a rough-tuning process of a control method according to one embodiment of the present invention. First, at step 310, the decision feedback equalizer 100 is still in an early stage of convergence, so one or more weight coefficients $cb_K$ and $cf_K$ in the feedback equalizer 110 and feedforward equalizer 120 are constrained. Upper boundary value $cb\_max_K$ and lower boundary value $cb\_min_K$ are set for each one or more weight coefficients $cb_K$, thereby to prevent each one or more weight coefficients $cb_K$ from exceeding corresponding upper boundary value $cb\_max_K$ and lower boundary value $cb\_min_K$. In addition, upper boundary value $cf\_max_K$ and lower boundary value $cf\_min_K$ are set for each one or more weight coefficients $cf_K$, thereby to prevent each one or more weight coefficients $cf_K$ from exceeding corresponding upper boundary value $cf\_max_K$ and lower boundary value $cf\_min_K$. In various embodiments, the upper/lower boundary values $cb\_max_K$ and $cb\_min_K$ corresponding to different weight coefficients $cb_K$ may be the same or different, and the upper/lower boundary values $cf\_max_K$ and $cf\_min_K$ corresponding to different weight coefficients $cf_K$ may also be the same or different. However, the absolute values of the upper boundary value $cb\_max_K$ and the lower boundary value $cb\_min_K$ must be smaller than the absolute value of the least-squares solution (or MMSE solution), so as to avoid the occurrence of error prorogation.

Furthermore, at step 320, the least-mean-square algorithm is used to make the decision feedback equalizer 100 gradually converge, which includes adjusting one or more weight coefficients $cf_K$ in the feedforward equalizer 120, adjusting of one or more weighting coefficients $cb_K$ in the feedback equalizer 110, and ensuring that the one or more weighting coefficients $cb_K$ will not exceed corresponding upper/lower boundary values $cb\_max_K$ and $cb\_min_K$, as well as the one or more weight coefficients $cf_K$ will not exceed corresponding upper/lower boundary values $cf\_max_K$ and $cf\_min_K$.

At step 330, it is checked whether a predetermined period of time T_avg has passed, and the signal-to-noise ratio of the decision feedback equalizer 100 meets a minimum requirement for stable convergence. The minimum requirement for stable convergence can be acknowledged by calculating the signal-to-noise ratio of the decision feedback equalizer 100 and comparing it with a threshold value SNR_stable, wherein the threshold value SNR_stable can be repeatedly testing the decision feedback equalizer 100 in advance, and then determined according to the signal-to-noise ratio at which the error propagation occurs.

If in the above process, it has been ensured that the decision feedback equalizer 100 enters a stable convergence state, then the control mechanism of the present invention will enter a fine-tuning process. At this time, the control mechanism of the present invention will relax the constraints on one or more weight coefficients $cb_K$ in the feedback equalizer 120 to pursue a better signal-to-noise ratio.

Figure 4:
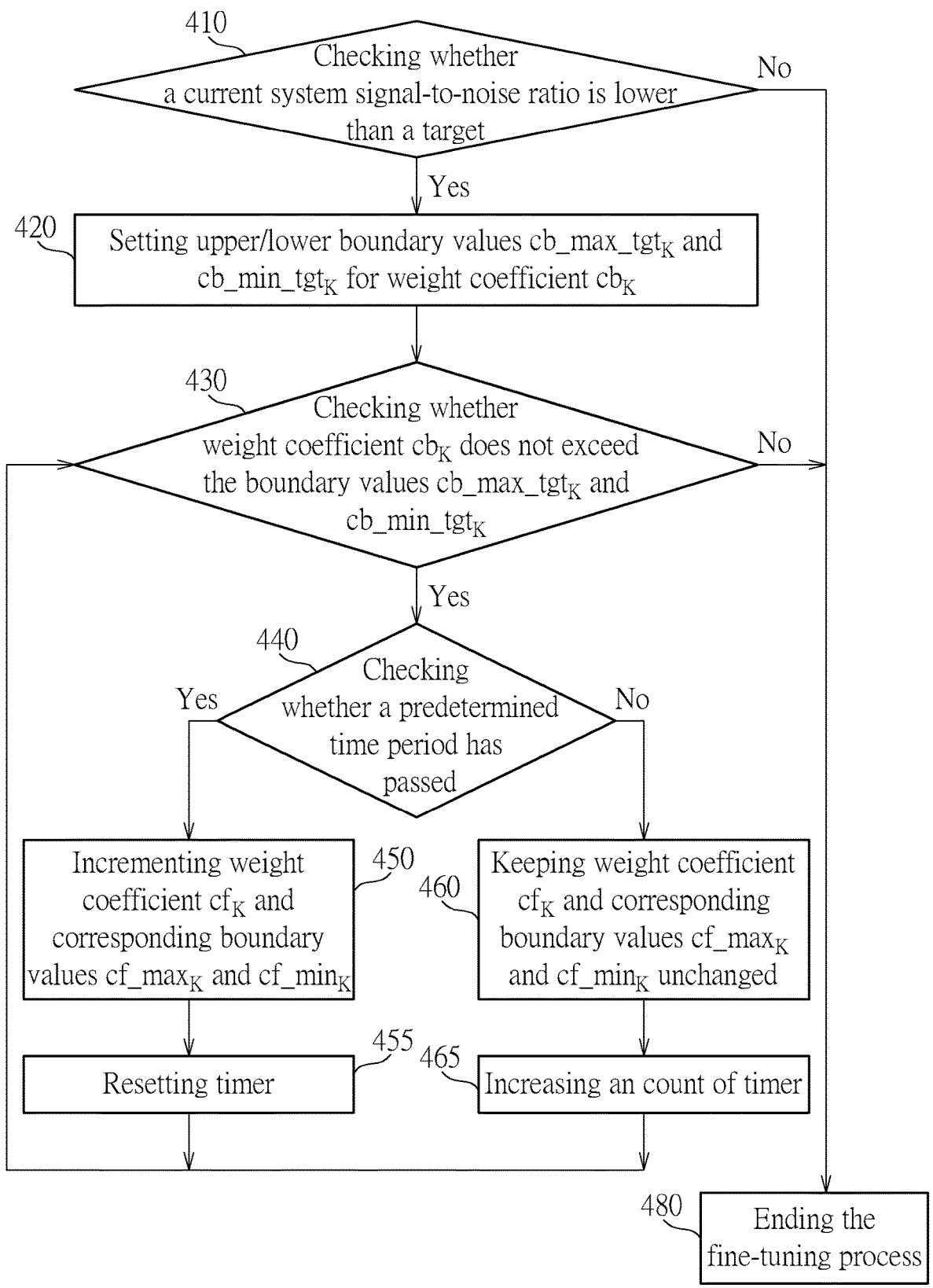
FIG. 4 is a flowchart of a fine-tuning process of a control method according to one embodiment of the present invention.

Please refer to a flowchart shown in FIG. 4, which illustrates a flow of the fine-tuning process of a control method according to one embodiment of the present invention. First, at step 410, the control mechanism of the present invention checks a current system signal-to-noise ratio. If the current system signal-to-noise ratio is high enough, the fine-tuning process is terminated, thereby to avoid the condition that the weight coefficient $cb_K$ of the feedback equalizer 120 becomes too high, such that the risk of error propagation can be avoided. However, if the current system signal-to-noise ratio still has room for further improve, the fine-tuning process will continue. Specifically, the current system signal-to-noise ratio will be compared with a target signal-to-noise ratio SNR_target. Only when the current system signal-to-noise ratio is lower than the target signal-to-noise ratio SNR_target, the fine-tuning process will continue.

At step 420, the weight coefficient control unit 140 will relax the constraints on the weight coefficients $cb_K$, which allows one or more weight coefficients $cb_K$ in the feedback equalizer 120 to get closer to the least-squares solution obtained by the least-mean-square-algorithm than those in the rough-tuning process. The weight coefficient control unit 140 sets a new upper boundary value $cb\_max\_tgt_K$ and a new lower boundary value $cb\_min\_tgt_K$ for each one or more weight coefficients $cb_K$, and requires that each one or more weight coefficients $cb_K$ shall not exceed corresponding upper boundary values $cb\_max\_tgt_K$ and lower boundary values $cb\_min\_tgt_K$. The upper boundary value $cb\_max\_tgt_K$ and the lower boundary value $cb\_min\_tgt_K$ set in the fine-tuning process are larger than the upper boundary value $cb\_max_K$ and the lower boundary value $cb\_min_K$ set in the early stage of convergence shown in FIG. 3. By relaxing the constraints on one or more weight coefficients $cb_K$, one or more weight coefficients $cb_K$ can get closer to the least-squares solution, and the system signal-to-noise ratio is therefore improved.

At step 430, the weight coefficient control unit 140 checks whether one or more weight coefficients $cb_K$ in the feedback equalizer 120 does not exceed the boundary values set at step 420. If the weight coefficient $cb_K$ has already exceeded the boundary values set at step 420, the fine-tuning process will also end (step 480). On the other hand, if the weight coefficient $cb_K$ still does not exceed the boundary values, the weight coefficient control unit 140 will gradually increase one or more weight coefficients $cf_K$ in the feedforward equalizer 110. As there is certain dependence between the weight coefficient $cb_K$ and the weight coefficient $cf_K$, the weight coefficient $cb_K$ will also increase accordingly.

In the control mechanism of the present invention, the weight coefficient control unit 140 will wait a predetermined time period T_thd before increasing the weight coefficient $cf_K$ (step 440). After the predetermined time period T_thd has passed, the flow will go to step 450 to adjust the weight coefficient $cf_K$; if not, the flow goes to step 460, keeping the weight coefficient $cf_K$ unchanged, and keep waiting (step 465).

In the fine-tuning process, each time the weight coefficient $cf_K$ is increased, it will take a predetermined waiting period before increasing the weight coefficient $cf_K$ again. The purpose of setting the predetermined waiting period is to ensure the stability of the system. Specifically, if the weight coefficient $cf_K$ is adjusted suddenly, transient errors may occur. When the transient error is too severe, the stability of the convergence of the decision feedback equalizer 100 may be impacted. Therefore, slow adjustments can avoid the transient errors. On the other hand, the length of the predetermined waiting period may vary according to the characteristics of the system. In extreme cases, the predetermined waiting period can be saved or extended.

At step 450, the weight coefficient control unit 140 will increment one or more weight coefficients $cf_K$ in the feedforward equalizer with an equal amount (e.g., with a step cf_step), and its corresponding boundary values $cf\_max_K$ and $cf\_min_K$. For example, each time step 450 is entered, the weight coefficient $cf_K$, the upper and lower boundary values $cf\_max_K$ and $cf\_min_K$ are simultaneously incremented by one unit of step cf_step, wherein the selection of step cf_step is also related to system characteristics. After each adjustment on the weight coefficient $cf_K$ and its corresponding upper/lower boundary values $cf\_max_K$ and $cf\_min_K$, the control mechanism of the present invention will re-confirm whether one or more weight coefficients $cb_K$ reach their corresponding boundary values $cb\_max\_tgt_K$ and $cb\_min\_tgt_K$ (i.e., returning to step 430). If yes, the fine-tuning process ends; otherwise, continue to adjust the weight coefficient $cf_K$ and its corresponding upper and lower boundary values $cf\_max_K$ and $cf\_min_K$ again.

Figure 5:
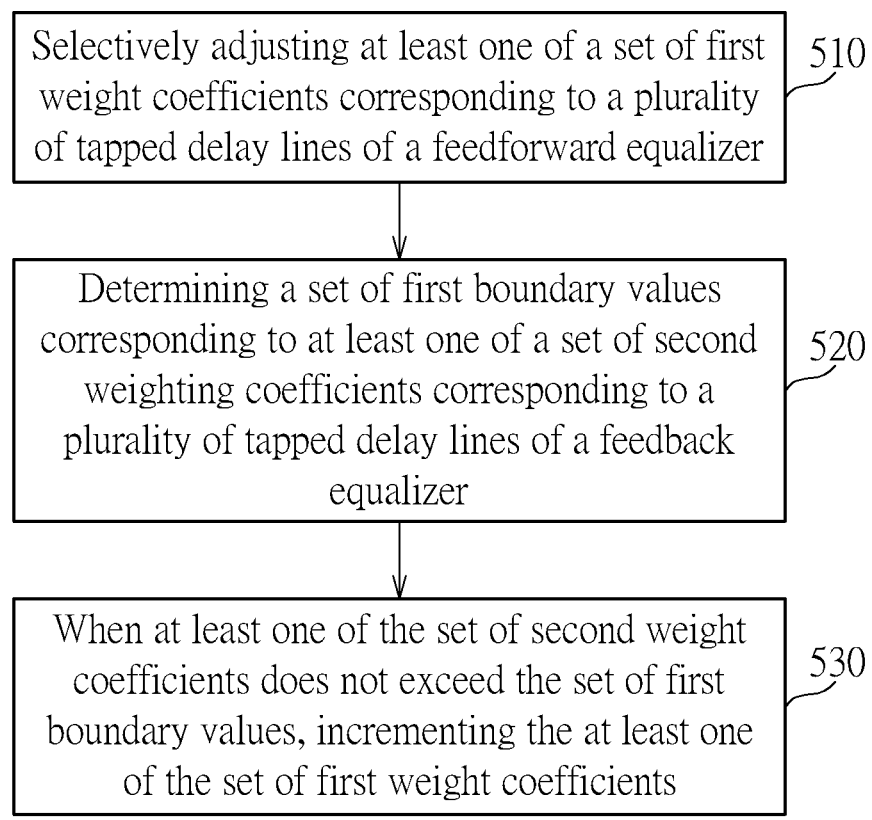
FIG. 5 is a simplified flowchart of a control method according to one embodiment of the present invention.

Please note that in some embodiments, the control method of the present invention may also only include the fine-tuning process shown in FIG. 4. That is, once the decision feedback equalizer 100 is confirmed staying in the stable convergence stage, the fine-tuning process is started. The control mechanism can different from the rough-tuning process shown in FIG. 3. In view of this, the control method of the present invention can be summarized as steps shown in FIG. 5:

Step 510: selectively adjusting at least one of a set of first weight coefficients corresponding to a plurality of tapped delay lines of a feedforward equalizer;

Step 520: determining a set of first boundary values corresponding to at least one of a set of second weighting coefficients corresponding to a plurality of tapped delay lines of a feedback equalizer; and Step 530: when at least one of the set of second weight coefficients does not exceed the set of first boundary values, the weight coefficient control unit increments the at least one of the set of first weight coefficients.

The above steps can still approach the same/similar processes and effects as the foregoing embodiments after appropriate changes and adjustments are applied to The present invention includes the following features: First, in the early stage of convergence using the least-mean-square algorithm, giving relatively strict constraints on the weight coefficients $cb_K$ of the feedback equalizer 120 to avoid getting too close to the least-squares solution. Therefore, the energy of the weighting of the feedback equalizer 120 can be limited, so that the occurrence of error propagation can be avoided. Only after a stable convergence state is entered, the constraints on the weight coefficients $cb_K$ will be relaxed, allowing the weight coefficients $cb_K$ to approach the least-squares solution, so that the decision feedback equalizer 100 can further improve the signal-to-noise ratio to an ideal target. Furthermore, after entering the stable convergence state, the weight coefficients $cf_K$ are more aggressively adjusted (regularly incremented with a fixed step), increasing the system signal-to-noise ratio faster. At the same time, by the setting of waiting period, avoiding transient error occurs while improving the signal-to-noise ratio. In this way, the present invention ensures the stability of the least-mean-square algorithm as well as a good signal-to-noise ratio.

Embodiments in accordance with the present invention can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A decision feedback equalizer for generating a decision output signal according to an input signal, comprising:
    a feedforward equalizer, having a plurality of tapped delay lines, controlled by a set of first weight coefficients;
    a feedback equalizer, having a plurality of tapped delay line, controlled by a set of second weight coefficients; and
    a weight coefficient control unit, arranged to selectively adjust at least one of the set of first weight coefficients and determine a set of first boundary values for at least one of the set of second weight coefficients, wherein the set of first boundary values define a maximum weight coefficient and a minimum weight coefficient for limiting the set of second weight coefficients, and; when the at least one of the set of second weight coefficients does not exceed the set of first boundary values, the weight coefficient control unit increments the at least one of the set of first weight coefficients; wherein the weight coefficient control unit also determines a set of third boundary values for at least one of the set of second weight coefficients, wherein the set of third boundary values are smaller than the set of first boundary values, and the set of third boundary values are smaller than a least-squares solution obtained by a least mean-square algorithm; wherein when a signal-to-noise ratio of the decision output signal is smaller than a stable signal-to-noise ratio, the weight coefficient control unit adjusts at least one of the set of the first weight coefficients and at least one of the set of second weight coefficients according to the least-mean-square algorithm until the signal-to-noise ratio of the decision output signal is not smaller than the stable signal-to-noise ratio.

2. The decision feedback equalizer of claim 1, wherein when the at least one of the set of second weight coefficients is identical to one of the set of first boundary values, the weight coefficient control unit does not increment the at least one of the set of first weight coefficients.

3. The decision feedback equalizer of claim 1, wherein the weight coefficient control unit waits for a predetermined waiting period between two successive processes of incrementing the at least one of the set of first weight coefficients.

4. The decision feedback equalizer of claim 1, wherein when the at least one of the set of second weight coefficients does not exceed the set of first boundary values, the weight coefficient control unit increments the at least one of the set of first weight coefficients and also increments a set of second boundary values corresponding to at least one of the set of first weight coefficients.

5. The decision feedback equalizer of claim 1, wherein before the weight coefficient control unit adjusts the at least one of the set of first weight coefficients, if a signal-to-noise ratio of the decision output signal is greater than or equal to a target signal-to-noise ratio, the weight coefficient control unit will not adjust any one of the set of first weight coefficients.

6. A method for controlling a decision feedback equalizer that generates a decision output signal according to an input signal, the decision feedback equalizer having a feedforward equalizer and a feedback equalizer, the method comprising:
    selectively adjusting a least one of a set of first weight coefficients that corresponds to a plurality of tapped delay lines of the feedforward equalizer;
    determining a set of first boundary values for at least one of a set of second weight coefficients that corresponds to a plurality of tapped delay lines of the feedback equalizer, wherein the set of first boundary values define a maximum weight coefficient and a minimum weight coefficient for limiting the set of second weight coefficients;
    when the at least one of the set of second weight coefficients does not exceed the set of first boundary values, incrementing the at least one of the set of first weight coefficients;
    determining a set of third boundary values for at least one of the set of second weight coefficients, wherein the set of third boundary values are smaller than the set of first boundary values, and the set of third boundary values are smaller than a least-squares solution obtained by a least mean-square algorithm; and
    when a signal-to-noise ratio of the decision output signal is smaller than a stable signal-to-noise ratio, adjusting at least one of the set of the first weight coefficients and at least one of the set of the second weight coefficients according to the least-mean-square algorithm until the signal-to-noise ratio of the decision output signal is not smaller than the stable signal-to-noise ratio.

7. The method of claim 6, wherein the step of selectively adjusting the least one of the set of first weight coefficients comprises:

when the at least one of the set of second weight coefficients is identical to one of the set of first boundary values, not incrementing the at least one of the set of first weight coefficients.

8. The method of claim 6, wherein the step of selectively adjusting the least one of the set of first weight coefficients comprises:

waiting for a predetermined waiting period between two successive processes of incrementing the at least one of the set of first weight coefficients.

9. The method of claim 6, wherein the step of selectively adjusting the least one of the set of first weight coefficients comprises:

when the at least one of the set of second weight coefficients does not exceed the set of first boundary values, incrementing the at least one of the set of first weight coefficients and also incrementing a set of second boundary values corresponding to at least one of the set of first weight coefficients.

10. The method of claim 6, further comprising:

before adjusting the at least one of the set of first weight coefficients, if a signal-to-noise ratio of the decision output signal is greater than or equal to a target signal-to-noise ratio, not adjusting any one of the set of first weight coefficients.

* * * * *